US009092835B2

(12) United States Patent
Giesbrecht et al.

(10) Patent No.: US 9,092,835 B2
(45) Date of Patent: Jul. 28, 2015

(54) VEHICLE NOISE DETECTABILITY CALCULATOR

(71) Applicant: Her Majesty the Queen in Right of Canada as Represented by the Minister of National Defence, Ottawa (CA)

(72) Inventors: Jared Giesbrecht, Medicine Hat (CA); Blaine Fairbrother, Redcliff (CA)

(*) Notice: Subject to any disclaimer, the term of this patent is extended or adjusted under 35 U.S.C. 154(b) by 404 days.

(21) Appl. No.: 13/758,508

(22) Filed: Feb. 4, 2013

(65) Prior Publication Data

US 2014/0210825 A1 Jul. 31, 2014

(30) Foreign Application Priority Data

Jan. 29, 2013 (CA) .................................... 2804120

(51) Int. Cl.
*H04R 29/00* (2006.01)
*G06Q 50/26* (2012.01)
*G06Q 10/04* (2012.01)
*G06Q 50/30* (2012.01)

(52) U.S. Cl.
CPC ............... *G06Q 50/26* (2013.01); *G06Q 10/04* (2013.01); *G06Q 10/047* (2013.01); *G06Q 50/30* (2013.01)

(58) Field of Classification Search
CPC ........ H04R 29/00; H04R 29/004; G01H 5/00; G06F 19/00; G06T 11/206
USPC .................... 381/56, 57, 71.1, 71.12; 700/94; 708/100
See application file for complete search history.

(56) References Cited

U.S. PATENT DOCUMENTS

| 6,504,490 | B2 | 1/2003 | Mizushima |
| 6,519,547 | B2 | 2/2003 | Lazauski et al. |
| 6,741,936 | B2 | 5/2004 | Pollet et al. |
| 7,383,104 | B2 | 6/2008 | Ishii et al. |
| 7,889,133 | B2 | 2/2011 | Smith et al. |
| 8,036,821 | B2 | 10/2011 | Cornett et al. |
| 8,164,484 | B2 | 4/2012 | Berger et al. |
| 2004/0174770 | A1* | 9/2004 | Rees ................................ 367/7 |
| 2006/0080418 | A1* | 4/2006 | Wu .............................. 709/220 |
| 2006/0253283 | A1 | 11/2006 | Jabloun |
| 2009/0115635 | A1* | 5/2009 | Berger et al. ................. 340/943 |
| 2009/0132106 | A1 | 5/2009 | DeJonge |
| 2010/0017114 | A1 | 1/2010 | Tehan et al. |

(Continued)

OTHER PUBLICATIONS

T.F.W. Embleton, Sound Propagation in Homogeneous Deciduous and Evergreen Woods, 1963, Acoustical Society of America, pp. 1119-1125, Jan. 28, 1963.*

(Continued)

*Primary Examiner* — Vivian Chin
*Assistant Examiner* — Friedrich W Fahnert
(74) *Attorney, Agent, or Firm* — Benoit & Cote Inc.

(57) ABSTRACT

A system for determining the detectability of a fleet of vehicles by a listener at a target site. The system receives as input at least the number of vehicles, a selection of a noise signature for each vehicle, and a distance to the target. The system may then estimate noise pressure level for the fleet along the estimated distance from the given location to the target site based on the noise signature associated with each vehicle and display a graph showing the noise pressure level vs. distance from the given location to the target site. In an embodiment, the system may estimate the background noise level at the target site and subtract this from the noise pressure level of the fleet at the target site to determine an expected noise level above background noise at the target site.

20 Claims, 10 Drawing Sheets

(56) References Cited

U.S. PATENT DOCUMENTS

2011/0096631 A1* 4/2011 Kondo et al. .............. 367/117
2012/0039479 A1 2/2012 Do et al.
2015/0030184 A1* 1/2015 Yamada .................... 381/120

OTHER PUBLICATIONS

T.F.W. Embleton, Tutorial on sound propagation outdoors, 1996, Journal Acoustical Society of America, pp. 31-48.*

Norasmadi Abdul Rahim, Paulraj M P, Abdul Hamid Adom, Sathishkumar Sundararaj, Moving Vehicle Noise Classification using Backpropagation Algorithm, International Colloquium on Signal Processing & Its Applications, IEEE, 2010, pp. 15-20.*

Huadong Wu, Mel Siegel, Pradeep Khosla, Vehicle Sound Signature Recognition by Frequency Vector Principal Component Analysis, 1998 IEEE Insturmentation and Measurement, pp. 429-434.*

David Sauter, David Marlin; A Mobile Decision Aid for Determining Detection Probabilities for Acoustic Targets; Army Research Laboratory; Proceedings of the Ground Target Modeling and Validation Conference [13th] Held in Houghton, MI on Aug. 5-8, 2002.

Harrison, Robin T.; Clark, Roger N.; Stankey, George H. 1980. Predicting impact of noise on recreationists. ED&T Project No. 2688. San Dimas, CA: USDA For. Serv., Equipment Development Center. 32 p.

http://globalecology.stanford.edu/SCOPE/SCOPE_24/SCOPE_24_1.12_Lamure.pdf.

http://web.archive.org/web/20110129034813/http://www.wyle.com/ServicesSolutions/science/EMMA/AcousticandVibrationConsulting/Tools/Pages/nmsim-T5.aspx—archived pages dated Jan. 29, 2011.

http://web.archive.org/web/20120303001605/http://www.softnoise.com/sourcedb.htm—archived pages dated Mar. 3, 2012.

http://web.archive.org/web/20121025070551/http://www.fhwa.dot.gov/environment/noise/traffic_noise_model/—archived pages dated Oct. 25, 2012.

Reed, S.E., J.L. Boggs, and J.P. Mann. 2010. SPreAD-GIS: an ArcGIS toolbox for modeling the propagation of engine noise in a wildland setting. Version 2.0. The Wilderness Society, San Francisco, CA.

* cited by examiner

FIGURE 3

| 1st vehicle | Select Type |
|---|---|
| 2nd vehicle | Select Type |
| 3rd vehicle | Select Type |
| 4th vehicle | Select Type |
| 5th vehicle | Select Type |
| ... | Select Type |
| ... | Select Type |
| Nth vehicle | Select Type |

| 1st vehicle | Select Type |
|---|---|
| 2nd vehicle | Type 1 |
| 3rd vehicle | Type 2 |
| 4th vehicle | Type 3 |
| 5th vehicle | Type 4 |
| | Type 5 |
| ... | Select Type |
| ... | Select Type |
| Nth vehicle | Select Type |

250

| Background noise | 00:20 |
|---|---|
| 1st vehicle | 00:20 |
| 2nd vehicle | 00:15 |
| 3rd vehicle | Start recording |
| 4th vehicle | Start recording |
| 5th vehicle | Start recording |
| ... | Start recording |
| ... | Start recording |
| Nth vehicle | Start recording |

FIGURE 9

VEHICLE NOISE DETECTABILITY CALCULATOR

CROSS-REFERENCE TO RELATED APPLICATIONS

This application claims priority from Foreign application no. 2804120 filed in Canada on Jan. 29, 2013.

BACKGROUND (a) Field

The subject matter disclosed generally relates to a system for determining the noise level (aka acoustic "footprint") of a vehicle at remote location.

(b) Related Prior Art

There is a need for a tool which allows for calculating the noise propagation of various vehicles of the fleet involved in the execution of an operation/mission.

There exist several commercially available software programs used to calculate vehicle noise and sound propagation. These programs are used primarily for planning roadway development but they are not designed nor are they suitable for use in military applications.

Cost wise, these programs are cost prohibitive because their licenses are very expansive to provide to a large amount of soldiers.

From the standpoint of practicality, these programs require powerful computers and use a substantial amount of processing resources available on these computers, in order to run. By contrast, soldiers require a portable tool that can be carried along in the mission.

Another barrier to practicality is the fact that these programs require a great deal of expertise on the part of the user, and detailed terrain and meteorological data that cannot be available to a soldier planning or conducting an operation in the field.

From the standpoint of accuracy, these programs are not designed for military applications and therefore do not respond to the needs of soldiers in the field. In particular, these programs are designed to estimate a noise level of vehicles on highways, and thus, they perform the calculations based on the assumption that all these vehicles have the same noise signature. By contrast, the noise signature of military vehicles is quite different from domestic vehicles. Such noise signature may even vary from one vehicle to another based on the size and shape of the vehicle, size and power of the engine, the muffler configuration, number of wheels, type of tires etc.

Therefore, the accuracy of noise level prediction achieved by these programs is quite low and inconsistent.

For these reasons, a new tool is needed which may be implemented on portable computing devices and used by an average soldier under operational conditions.

SUMMARY

The present embodiments provide for such tool.

According to a first aspect, there is provided a method implemented on portable device for determining a detectability at a target site of a noise level emitted by a fleet of vehicles including at least one vehicle at a given location, the method comprising: receiving a noise signature for each vehicle in the fleet; receiving a user input indicating an estimated distance to the target site; estimating noise pressure level for the fleet along the estimated distance from the given location to the target site based on the noise signature associated with each vehicle; calculating a background noise level at the target site; subtracting the background noise level at the target site from the noise pressure level of the fleet at the target site to determine an expected noise level above background noise at the target site thereby providing an estimate of the detectability of the fleet at the target site; displaying the expected noise level above background noise at the target site.

In an embodiment, the method further comprises displaying a graph showing the noise pressure level of the fleet vs. distance from the given location to the target site.

In another embodiment, the method further comprises receiving a user input indicating a type of vegetation cover at the target site; receiving a user input indicating meteorological information comprising at least wind speed and direction; and calculating the background noise level at the target site based on the type of vegetation cover at the target site and the meteorological information.

In a further embodiment, the method further comprises receiving an audio signal representing a background noise at the given location; wherein calculating the background noise at the target site is based on the background noise at the given location, the type of vegetation cover at the target site and the meteorological information.

In an embodiment, the method further comprises receiving a user input indicating a type of vegetation cover at the given location; wherein calculating the background noise at the target site is based on the background noise at the given location, the type of vegetation cover at the given location, the type of vegetation cover at the target site, and the meteorological information.

In another embodiment, the method further comprises receiving a user input representing a planned route for the fleet on an electronic map; receiving a user input representing a type of vegetation cover along the planned route; receiving meteorological information comprising at least wind speed and direction; calculating estimated background noise level at the target site based on the type of vegetation cover and the meteorological information; calculating estimated noise pressure level of the fleet along the planned route using selected vegetation cover and meteorological information, and the noise signature associated with each vehicle in the fleet; and subtracting the estimated background noise level at the target site from the estimated noise pressure level of the fleet along the planned route to determine an expected noise level above background noise at the target site thereby providing an estimate of the detectability of the fleet along the planned route.

In an embodiment, the method further comprises categorizing the estimate of the detectability as a level of risk being at least one of high, medium or low and assigning a color to each level, thereby defining detectability level colors; overlaying the detectability level colors on the planned route thereby showing a map indicating by colors areas of detectability of the fleet along the planned route.

In a further embodiment, receiving a noise signature for each vehicle in the fleet comprises storing a plurality of different noise signatures in a library, each noise signature being associated with a different vehicle; and receiving a user selection of a noise signature for each vehicle in the fleet.

In yet a further embodiment, receiving a noise signature for each vehicle in the fleet comprises receiving, for each vehicle in the fleet, an audio signal representing the noise level generated by that vehicle; and processing the audio signal to obtain the noise signature associated with each vehicle.

In an embodiment, the method further comprises recording noise generated by the vehicle using a microphone operably connected to the portable device.

In a second aspect, there is provided a method implemented on portable device for determining a detectability at a target site of a noise level emitted by a fleet of vehicles including at least one vehicle at a given location, the method comprising: receiving a noise signature for each vehicle in the fleet; receiving a first user input indicating an estimated distance to the target site; estimating noise pressure level for the fleet along the estimated distance from the given location to the target site based on the noise signature associated with each vehicle; and displaying a graph showing the noise pressure level vs. distance from the given location to the target site.

In an embodiment, the method further comprises receiving an audio file representing a background noise level at the given location; using the audio file estimating a background noise level at the target site; subtracting the estimated background noise level at the target site from the noise pressure level of the fleet at the target site to determine an expected noise level above background noise at the target site.

In another embodiment, the method further comprises receiving meteorological information from a remote server over a telecommunications network, the meteorological information comprising at least wind speed and direction; receiving a user input indicating a type of vegetation cover; and calculating the estimated background noise level at the target site using the type of vegetation cover, the meteorological information, and the background noise at the given location.

In a further aspect, there is provided a device for determining a detectability at a target site of a noise level emitted by a fleet of vehicles including at least one vehicle at a given location, the device having access to computer readable statements and instructions which when executed cause the device to perform the steps of receiving a noise signature for each vehicle in the fleet; receiving a user input indicating an estimated distance to the target site; estimating noise pressure level for the fleet along the estimated distance from the given location to the target site based on the noise signature associated with each vehicle; calculating a background noise level at the target site; subtracting the background noise level at the target site from the noise pressure level of the fleet at the target site to determine an expected noise level above background noise at the target site thereby providing an estimate of the detectability of the fleet at the target site; and displaying the expected noise level above background noise at the target site.

In an embodiment, the system comprises statements and instructions which cause the device to display a graph showing the noise pressure level of the fleet vs. distance from the given location to the target site.

In another embodiment, the system comprises statements and instructions which cause the device to perform the steps of: receiving a user input indicating a type of vegetation cover at the target site; receiving a user input indicating meteorological information comprising at least wind speed and direction; and calculating the background noise level at the target site based on the type of vegetation cover at the target site and the meteorological information.

In a further embodiment, the system comprises statements and instructions which cause the device to receiving an audio signal representing a background noise at the given location, wherein calculating the background noise at the target site is based on the background noise at the given location, the type of vegetation cover at the target site and the meteorological information.

In yet a further embodiment, the system comprises statements and instructions which cause the device to receive a user input indicating a type of vegetation cover at the given location, wherein calculating the background noise at the target site is based on the background noise at the given location, the type of vegetation cover at the given location, the type of vegetation cover at the target site, and the meteorological information.

In an embodiment, the system comprises statements and instructions which cause the device to perform the steps of: receiving a user input representing a planned route for the fleet on an electronic map; receiving a user input representing a type of vegetation cover along the planned route; receiving meteorological information comprising at least wind speed and direction; calculating estimated background noise level at the target site based on the type of vegetation cover and the meteorological information; calculating estimated noise pressure level of the fleet along the planned route using selected vegetation cover and meteorological information, and the noise signature associated with each vehicle in the fleet; and subtracting the estimated background noise level at the target site from the estimated noise pressure level of the fleet along the planned route to determine an expected noise level above background noise at the target site thereby providing an estimate of the detectability of the fleet along the planned route.

In another embodiment, the system further comprises statements and instructions which cause the device to perform the steps of categorizing the estimate of the detectability as a level of risk being at least one of high, medium or low and assigning a color to each level, thereby defining detectability level colors; and overlaying the detectability level colors on the planned route thereby showing a map indicating by colors areas of detectability of the fleet along the planned route.

Definitions

In the present specification, the following terms are meant to be defined as indicated below:

Sound pressure level: Sound pressure level is the most common way to express the "loudness" of a sound at the listener. Sound pressure level is the logarithmic measure of the ratio of a measured air pressure to a reference value. For most cases, SPL is defined a $L=20 \log (p/p_{ref})$, where p is the measured pressure and pref is the reference value (usually 20 uPa), expressed in decibels (dB). A sound pressure level increase of 6 dB means twice as much pressure, but a sound pressure level increase of 10 dB is (approximately) perceived as being twice a loud.

Noise level and sound level: Sound level and noise level should be interpreted as meaning sound pressure level of the noise and the sound, respectively. "Noise level" connotes an unwanted sound, whereas "sound level" is more neutral.

A-weighted noise level at the target: For a given sound pressure level, the human ear will perceive different frequencies of sounds as being quieter or louder. A-Weighting is a curve that is applied to a measured sound spectrum to approximate (or weight) the different frequencies to approximate the perception by a human listener.

⅓ octave band spectrum: For a given sound source, rather than viewing the sound pressure as a continuous spectrum, it is common to break the spectrum into a discrete set of frequency bands, and express the pressure level for each band. Typically, the audio spectrum is divided into 11 octave bands in the range of 20 hZ to 20 kHz, with the 7th octave bands center frequency defined to be at 1000 Hz. The frequency bands are normally chosen such that the highest frequency in the band is twice the lowest frequency in the band, and the center frequency is the lowest frequency multiplied by the square root of 2. For third octave bands, the 20 hz to 20 kHz spectrum is divided into 31 bands.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 3 illustrates a screen shot illustrating an example of a potential layout of the user interface when the system is operating in complex mode;

FIG. 9 illustrates an example of a user interface that may be used for recording the different noise levels needed to estimate the acoustic footprint at the listener's location;

It will be noted that throughout the appended drawings, like features are identified by like reference numerals.

DETAILED DESCRIPTION

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the invention to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptop computers, tablet devices or any computing device having sufficient computing resources to implement the embodiments.

Briefly stated the invention relates to a new tool which allows for measuring the acoustic "footprint" of a fleet of military vehicles involved in the execution of a mission at the location of the listener (aka target site) e.g. where the enemy is expected to be present, in order to determine a measure of detectability of the fleet by the listener. In an embodiment, the tool is designed to require low computational resources, which allows it to run on portable computing devices already in use by the soldiers e.g. Smart phones, PDAs or the like.

Modes of Operation

Figure 1:
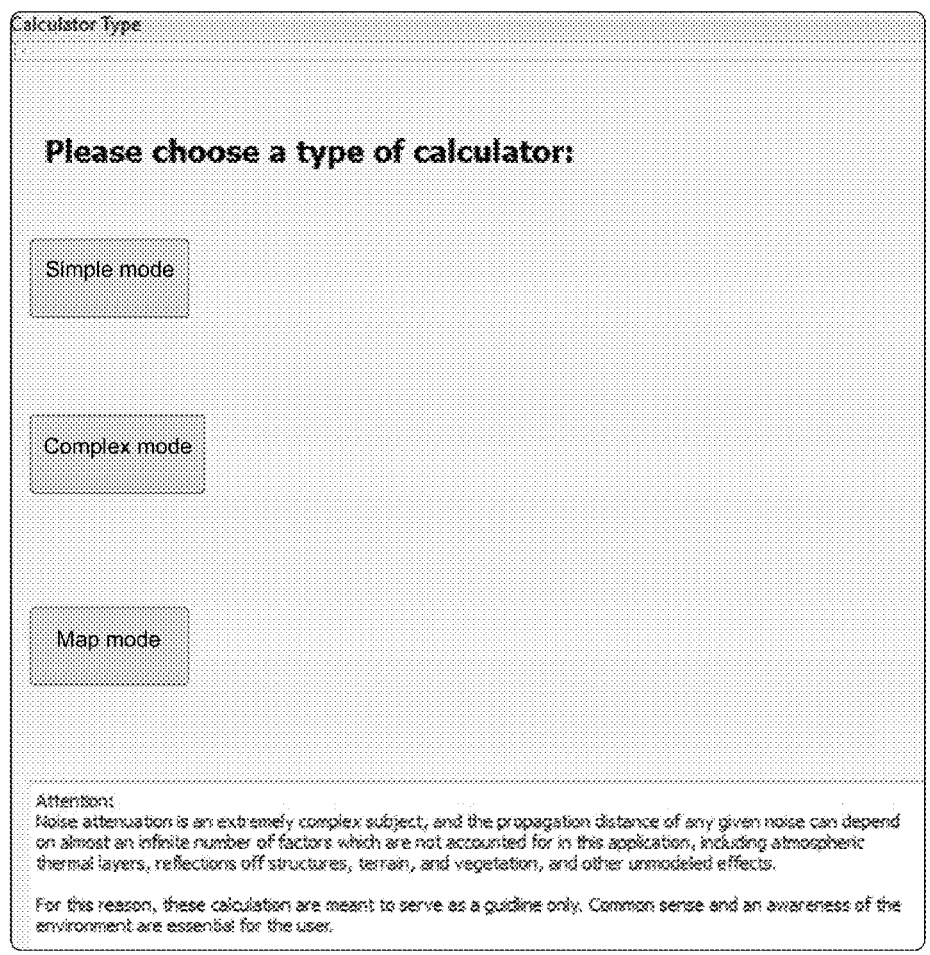
FIG. 1 illustrates a screen shot of the welcome page which allows the user to choose a mode of operation, in accordance with an embodiment.

In an embodiment, the tool may offer three modes of operations: a simple mode, a complex mode, and a map mode. An example is provided in FIG. 1 which illustrates a screen shot of the welcome page which allows the user to choose a mode of operation.

Figure 2:
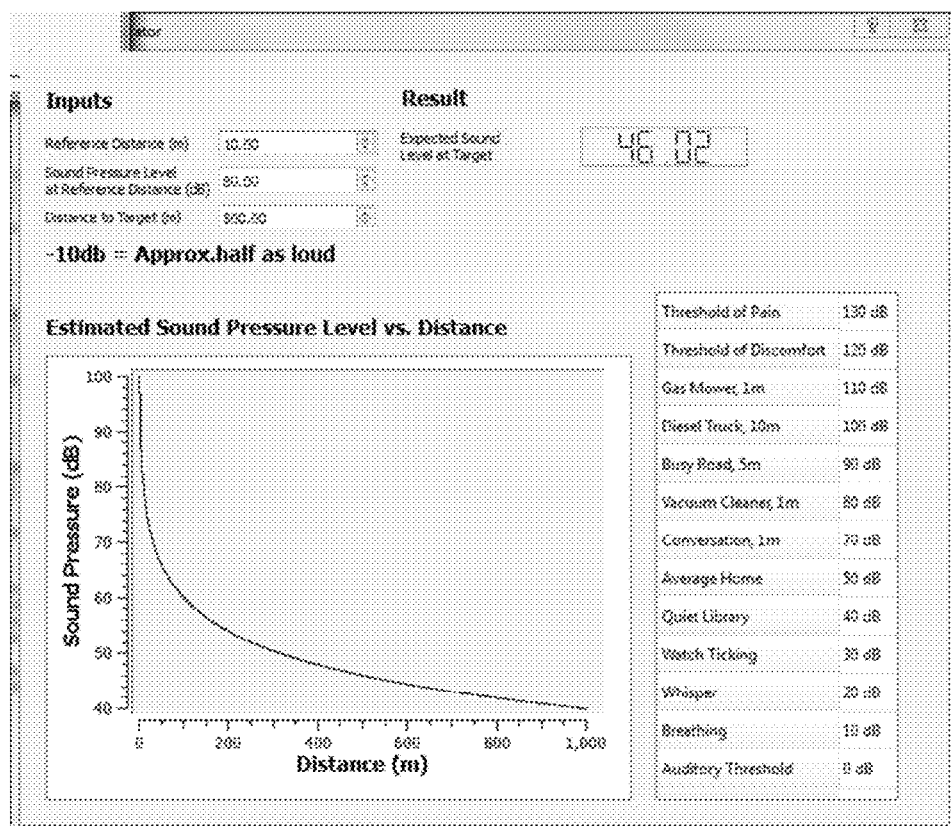
FIG. 2 is a screen shot illustrating an example of a layout of the user interface when the system is operating in simple mode.

FIG. 2 is a screen shot illustrating an example of a layout of the user interface when the system is operating in simple mode. The simple mode requires limited expertise in acoustics on the part of the user, and limited meteorological and terrain inputs. The simple mode provides an estimate of the vehicle noise levels and propagation under reasonable worst-case conditions, requiring very little input on the part of the user. In this mode, the user may select a vehicle noise source from a pre-defined noise source library, the number of vehicles, and an expected distance to target. The program will then calculate and display an expected A-weighted noise level at the target, as well as a graph depicting the expected sound pressure level vs. distance from the source.

In an embodiment, the accuracy of the results provided in the simple mode may be improved without requiring a great deal of expertise on the part of the user. For example, the user may record the background noise at the user's location using a microphone operably connected to the computing device in order to estimate the background noise at the listener. Whereby the system may subtract the background noise of the listener from the sound pressure level of the fleet to determine the likelihood of detectability at the target site. This will be explained in further detail herein below.

In a further embodiment, the computing device may obtain meteorological information from a remote server and use this info to estimate the background noise level at the target site, without requiring the user to enter this information into the system as will be described in further detail herein below.

Figure 3:
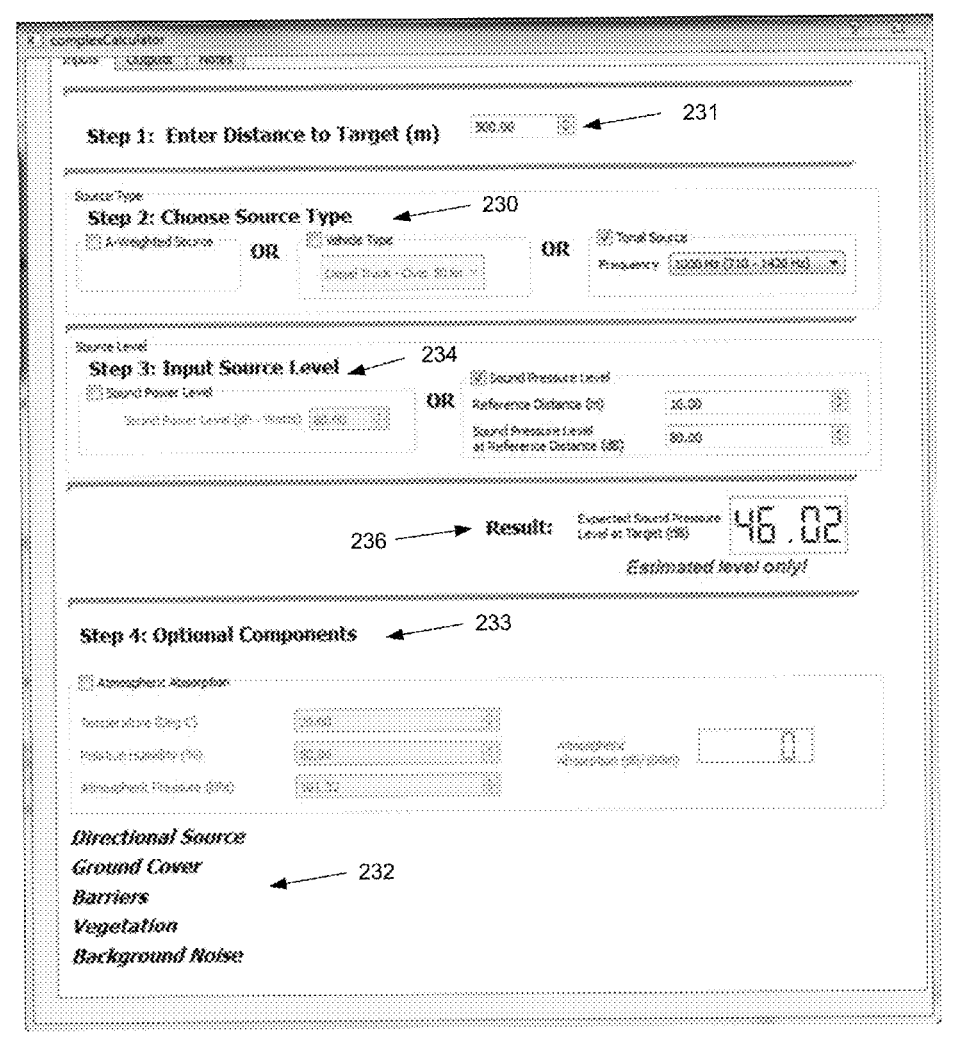

FIG. 3 illustrates a screen shot illustrating an example of a potential layout of the user interface when the system is operating in complex mode. The complex mode is for use by more sophisticated users and provides more options and subsequently better accuracy. In this mode, the user will be able to perform one or more of the following:

a. input a distance and direction to a potential listener as shown at 231;

b. choose a type and number of vehicles as a noise source, and input their own A-weighted noise source, or even a ⅓ octave band spectrum to be used as a noise source, as shown at 230;

c. Input meteorological information, such as air temperature at ground level, barometric pressure, wind speed and direction, relative humidity, ground cover, vegetation, time of day and season, as shown at 232 and 233. This info may be used by the system to determine the background noise at the target site.

d. choose a source power level, as shown at 234.

e. view estimated sound pressure level at the listener's location (target site) as shown at 236. This should also involve a measure of detectability of the noise source, based on the sound quality being emitted by the vehicle, and the background noise at the target site.

Figure 4:
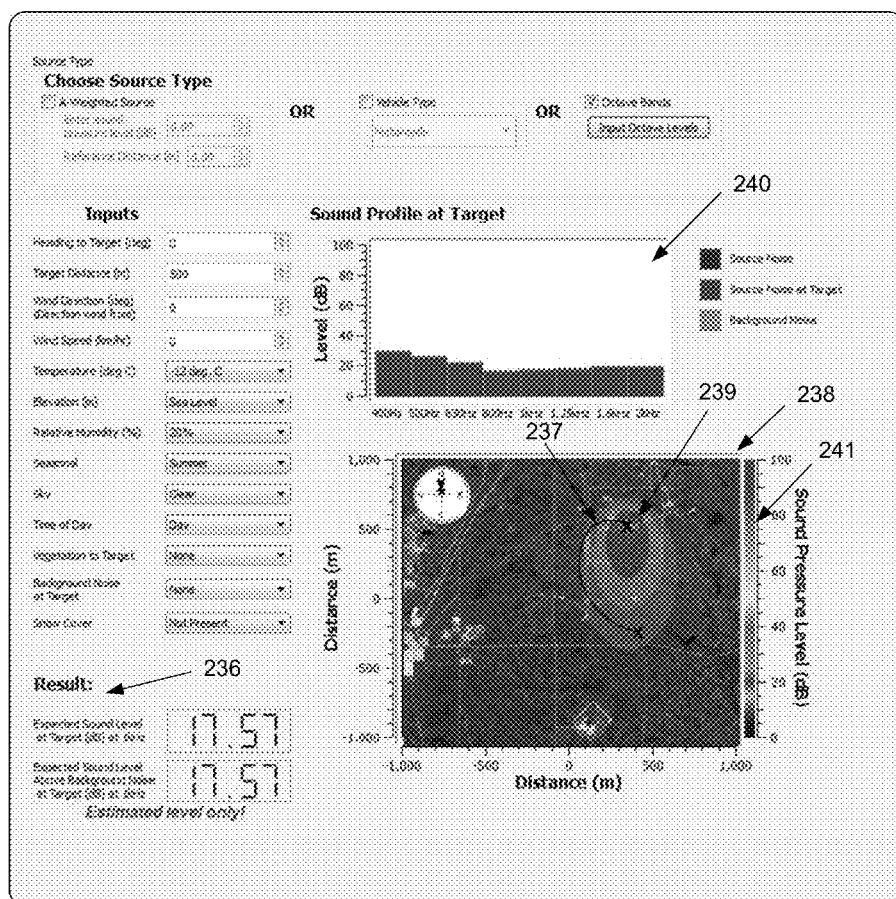
FIG. 4 illustrates a screen shot illustrating an example of a potential layout of the user interface when the system is operating in map mode.

FIG. 4 illustrates a screen shot illustrating an example of a potential layout of the user interface when the system is operating in map mode. In this mode, the user may be able to input all of the information as in the Complex Mode. In addition, the user may be able to:

a. Graphically input a planned route 237 on a map display as shown at 238. This map could come from a readily available source such as Google Maps; and b. View a graphical display of the estimated noise level above background level on a 2-dimensional plot based on the current wind speed and direction, and other inputs provided, as shown at 239.

c. View the expected noise footprint on the same map display with an "area of detectability" overlay as shown at 239. This calculation may be based on the expected background noise in the environment, and may be color coded to indicate high, medium, and low risk areas of being heard by an adversary as indicated at 239. The program may or may not have geographic terrain elevation data available to make these calculations.

d. View estimated A-weighted and octave band noise levels at the source and at a specified distance and direction to a potential target, as shown at 240.

As shown at 238, the 2-dimensional plot may be color coded to indicate the sound pressure level in the surrounding environment. For example, as shown in FIG. 4, the colors may change between red to blue as indicated by the scale 240, according to which red represent the highest sound pressure level (100 db) which is very likely to be heard and detected by the listener at the target site, and blue represents the lowest sound pressure level (0 db) which is below the background noise.

The embodiment of FIG. 4 allows the user to plan a route 239 from the user's location to the target site (location of the listener) and visualize the risk of being detected using the colors coded 2d plot which represents the sound pressure level in the entire area. Whereby, the user may choose to take detours or change the route in order to avoid areas where the sound pressure level of the fleet is high enough to be heard at the listener's location.

The user's input may be received using a pointing device such as a mouse, touch sensitive display, pen, keyboard, joystick or any similar type of interface which allows the user to plan a route on the map.

Noise Signatures Sources

Figures 5, 6, 6A:
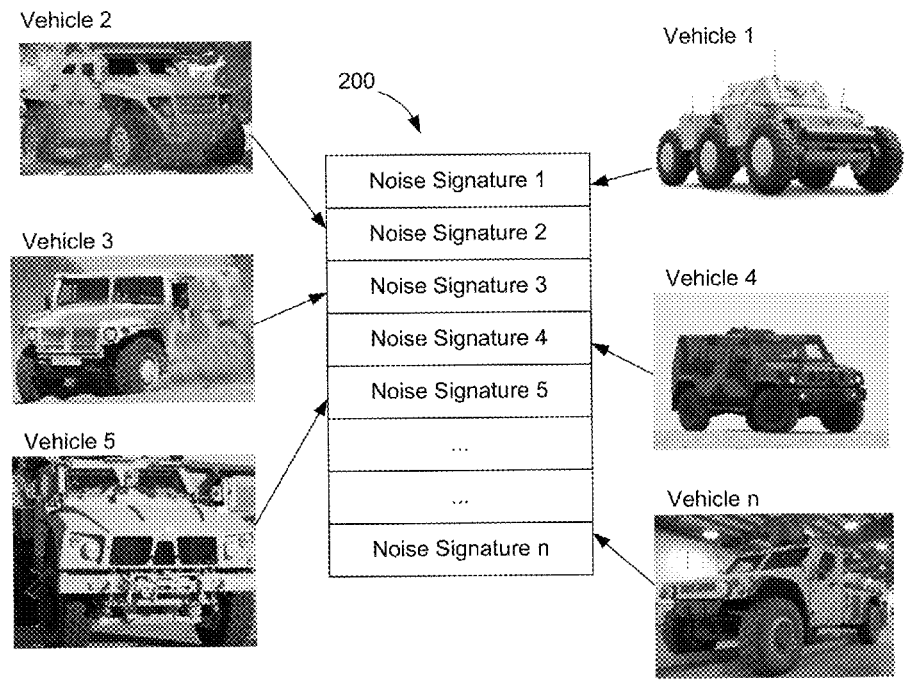
FIG. 5 illustrates an example of a library storing a plurality of noise signatures for a plurality of ground vehicles, in accordance with an embodiment.
FIGS. 6 and 6a illustrate an example of how the system may receive the user input about the type and order of the vehicles in the fleet, in accordance with an embodiment.

FIG. 5 illustrates an example of a library storing a plurality of noise signatures for a plurality of ground vehicles, in accordance with an embodiment. As discussed above, the noise signature of a plurality of vehicles may be stored in a library 200 stored in and/or connected to the computing device, as exemplified in FIG. 5, whereby when calculating the acoustic footprint of the fleet the user may select the noise signatures that correspond to the vehicles used in the fleet, and the number of signatures that corresponds to the number of vehicles used from each type. For example, in one embodiment if there are two vehicles type 1 and three vehicles type 4, the user may select the noise signature 1 twice (or multiplied it by two) and the noise signature 4 three times (or multiply it by three) in order for the system to calculate the acoustic footprint at the listener's location.

In a further embodiment, the system may allow the user to enter the noise signatures of the vehicles in the order in which the vehicles are provided on the road. An example is shown in FIG. 6 which illustrates an example of how the system may receive the user input about the type and order of the vehicles in the fleet.

For example, if the vehicle leading the mission is type 1, followed by two vehicles type 3, and a last vehicle type 5, the user may consecutively select noise signature 1, noise signature 3, noise signature 3, and noise signature 5. This tool may be useful in planning missions which require a large amount of vehicles whereby the user may be able to try different arrangements for the vehicles to choose the arrangement having the lowest acoustic footprint e.g. to spread the noisy vehicles throughout the fleet versus providing them in vicinity of each other whereby their resulting noise may add up and become detectable at the location of the listener.

In the present embodiments, the user may make a selection of available options e.g. type of vegetation cover, type of vehicles, etc. in the interface from a drop down menu, rolling wheel or any similar technique. For example, as shown in FIG. 6a in order to select a type of vehicle for the first vehicle in the fleet the user may tap on or select the "select type" option beside the "first vehicle" button, whereby a drop down menu 250 may be displayed for the user to choose a vehicle type.

Figure 7:
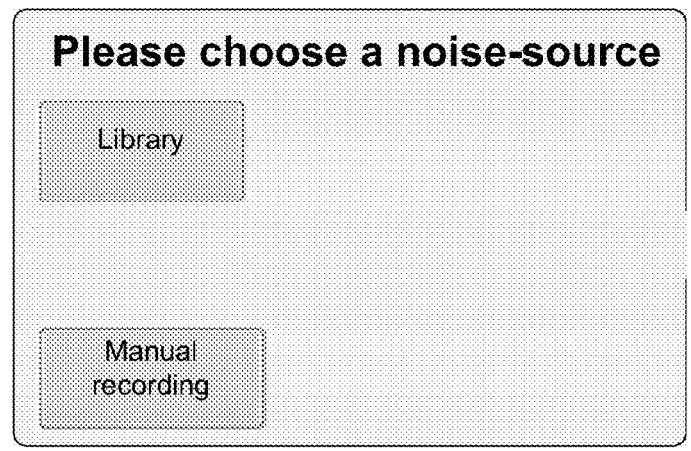
FIG. 7 illustrates a screen shot illustrating an example of how the user may choose a noise source for the system to perform the calculation.

In another embodiment, instead of obtaining the noise signatures of each vehicle from the library 200 as shown in FIGS. 5 and 6, it is possible to obtain this information live using a microphone when performing the analysis. For example, after (or before) the user chooses a mode of operation in FIG. 1, the system may request the user to choose a noise source, as exemplified in FIG. 7, whereby the user may either choose the library 200 as a source for the noise signatures of the different vehicles, or the manual recording option which allows the user to record the various sounds generated by the different vehicles as well as the background noise.

Figure 8:
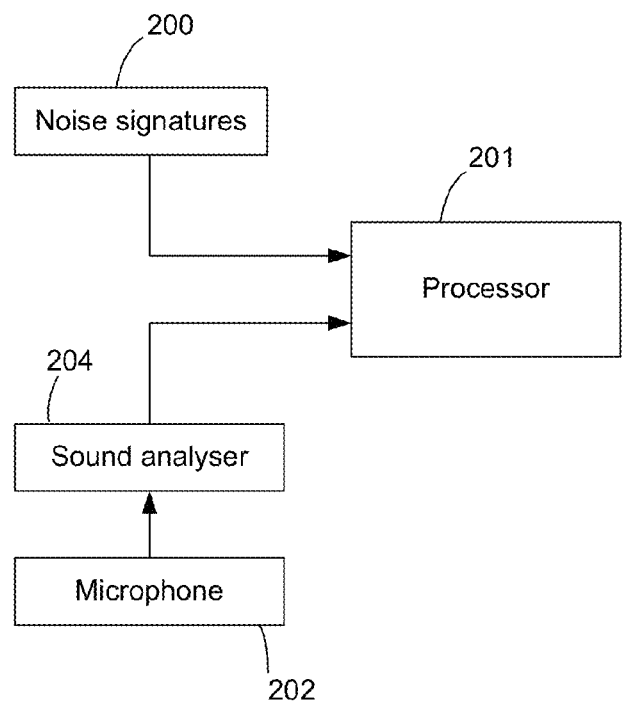
FIG. 8 is a block diagram illustrating an embodiment of a system which is adapted to receive the vehicle noise from different sources in order to determine the acoustic footprint at the listener.

FIG. 8 is a block diagram illustrating an embodiment of a system which is adapted to receive the vehicle noise from different sources in order to determine the acoustic footprint at the listener. As shown in FIG. 8, the processor 201 may receive the noise signatures from the library 200 as discussed above, and may also receive this information from a microphone 202 operably connected to the processor 201. For example, using the microphone 202 provided in the portable device (or an external microphone operably connected to the portable device), the user may capture the noise generated by each vehicle. The microphone 202 may be connected to a sound analyzer module 204 for analyzing the sound and obtaining the noise signature for sending this info to the processor 201. It is also possible that the sound analyzer module 204 be implemented within the processor 201.

The embodiment of recording the noise levels may be implemented in a variety of different methods. FIG. 9 illustrates an example of a user interface that may be used for recording the different noises needed to estimate the acoustic footprint at the listener's location. As shown in FIG. 9, the user may record the background noise, whereby all the vehicles must be turned off. The duration of the recording may be preset to a certain duration that provides for sufficient sampling e.g. 20 seconds. In order to record the noise generated by the vehicles, the vehicles may be turned on and off one by one to record the noise generated by each one them, such that only the vehicle that is being recorded remain on at the time of recording.

Sound Pressure Level at the Listener

Using the noise signatures discussed above, the system may determine the sound pressure level of the fleet (all the vehicles involved in the mission) at the location of the user. The system may then estimate the sound pressure level of the vehicles at the listener's location using at least the distance between the user and the listener. Other information may also be input which may increase the accuracy of the estimation. For example, the speed and direction of the wind. The weather conditions (meteorological information), the type of vegetation at the user's location and the listener's location etc. as discussed above with respect to the complex mode and map mode.

The sound pressure level at the listener may be displayed as a number, as shown at 234 (FIG. 3) and may also be provided in the form of a graph which shows how the different sound pressure levels at the different distances as shown in FIG. 2, or may also be provided in the form of a 2D plot as shown at 238 which allows the user to view the different sound pressure levels in the area surrounding the user and/or the listener.

Background Noise at the Listener

In an embodiment, the system estimates the background noise level at the listener's location in order to accurately determine the detectabilibty of the fleet at the listener's location.

In an embodiment, the system may determine the background noise level based on meteorological information and the type of vegetation at the listener's location. The meteorological information may either be input by a user or received from a remote server over a telecommunications network such a wireless data network, the internet or the like. The meteorological information may include the type of weather (for example: sunny, rainy, snowy, cloudy, foggy, etc.) and the direction and speed of wind.

In a further embodiment, the background noise at the user's location may be recorded by the user (as discussed above) and entered into the system. The system may use the background noise recorded at the user's location in order to determine the background noise at the listener's location. The calculation depends on the mode of operation. For example, if the user is operating the system in the simple mode. The system may assume that the background noise is the same at the user's location and at the listener's location.

By contrast, if the system is operating in the complex and/or map modes the system may use the recorded background noise at the user's location along with the meteorological information and the type of vegetation at the user's location and/or at the listener's location to determine an estimate of background noise at the listener's location.

For example, if there is no wind and the type of vegetation is the same at the user's location and at the listener's location, the system may conclude that the background noise recorded at the user's location is substantially the same as the background noise at the listener's location. However, if it is windy and the listener is between trees while there are no trees at the location of the user, the system may conclude that the background noise level at the listener's location is higher than the background noise at the user's location due to the wind making sounds in the presence of trees etc.

Detectability at the Listener

As discussed above, the system determines the background noise level at the listener in order to accurately determine the detectabilibty of the fleet at the listener's location. In an embodiment, the system subtracts the background noise level at the listener's location from the sound pressure level generated by the fleet in order to determine the expected noise level above the background noise at the listener's location.

Figure 10:
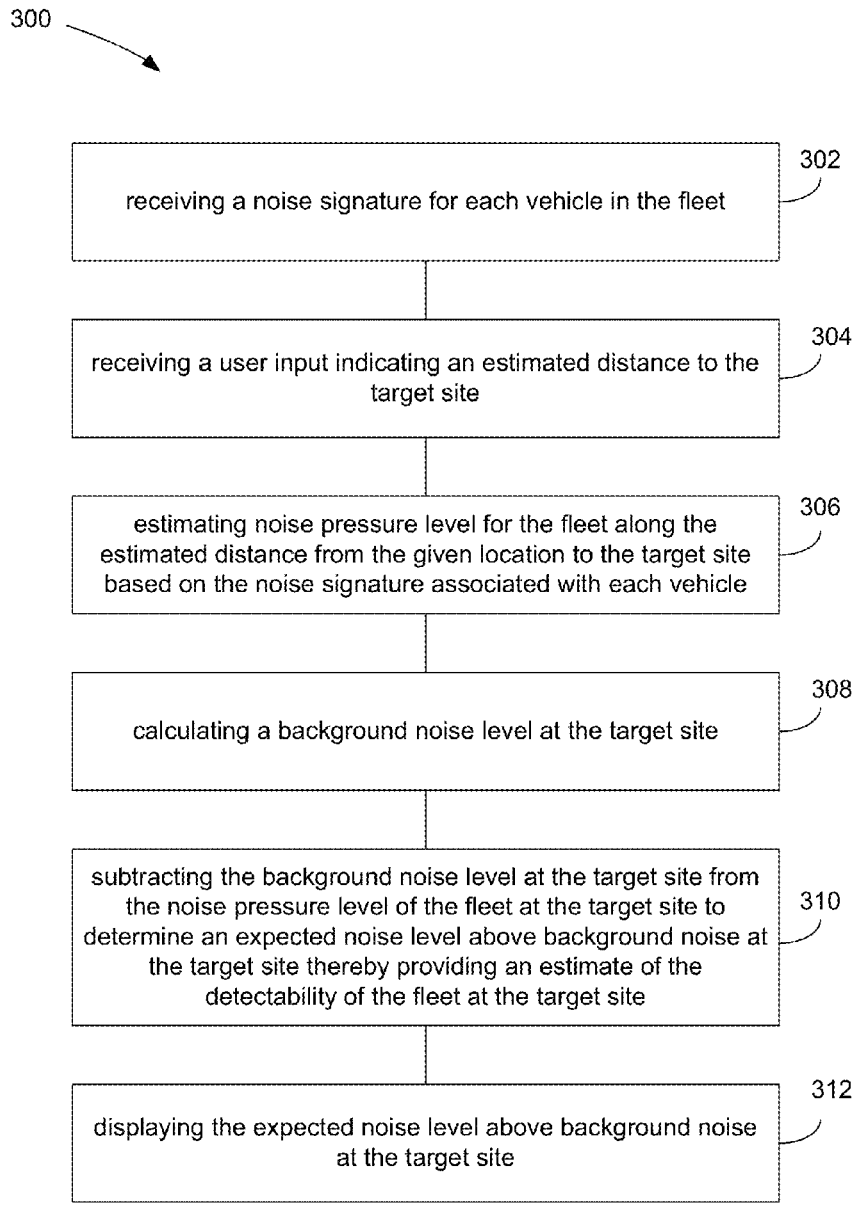
FIG. 10 is a flowchart of a method for determining the detectability of the fleet at a target site, in accordance with an embodiment.

FIG. 10 is a flowchart of a method 300 for determining the detectability of the fleet at a target site, in accordance with an embodiment. Step 302 includes receiving a noise signature for each vehicle in the fleet. Step 304 includes receiving a user input indicating an estimated distance to the target site. Step 306 includes estimating noise pressure level for the fleet along the estimated distance from the given location to the target site based on the noise signature associated with each vehicle. Step 308 includes calculating a background noise level at the target site. Step 310 includes subtracting the background noise level at the target site from the noise pressure level of the fleet at the target site to determine an expected noise level above background noise at the target site thereby providing an estimate of the detectability of the fleet at the target site. Step 312 includes displaying the expected noise level above background noise at the target site.

Figure 11:
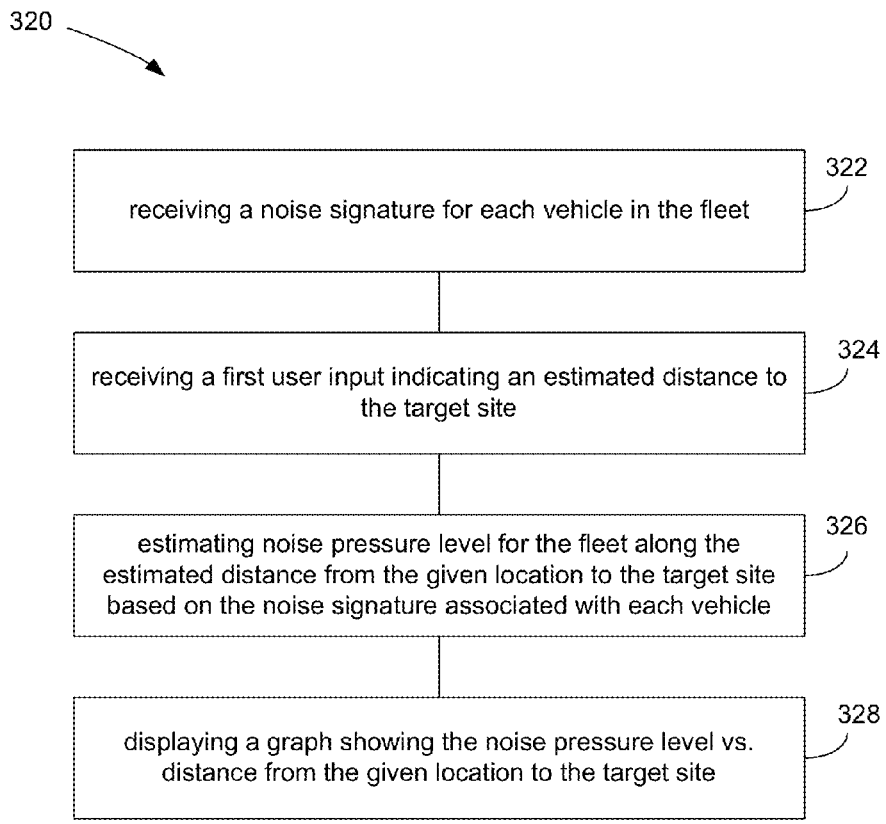
FIG. 11 is a flowchart of a method for determining the detectability of the fleet at a target site, in accordance with another embodiment.

FIG. 11 is a flowchart of a method 320 for determining the detectability of the fleet at a target site, in accordance with another embodiment. Step 322 comprises receiving a noise signature for each vehicle in the fleet. Step 324 comprises receiving a first user input indicating an estimated distance to the target site. Step 326 comprises estimating noise pressure level for the fleet along the estimated distance from the given location to the target site based on the noise signature associated with each vehicle. Step 328 comprises displaying a graph showing the noise pressure level vs. distance from the given location to the target site.

Hardware and Operating Environment

Figure 12:
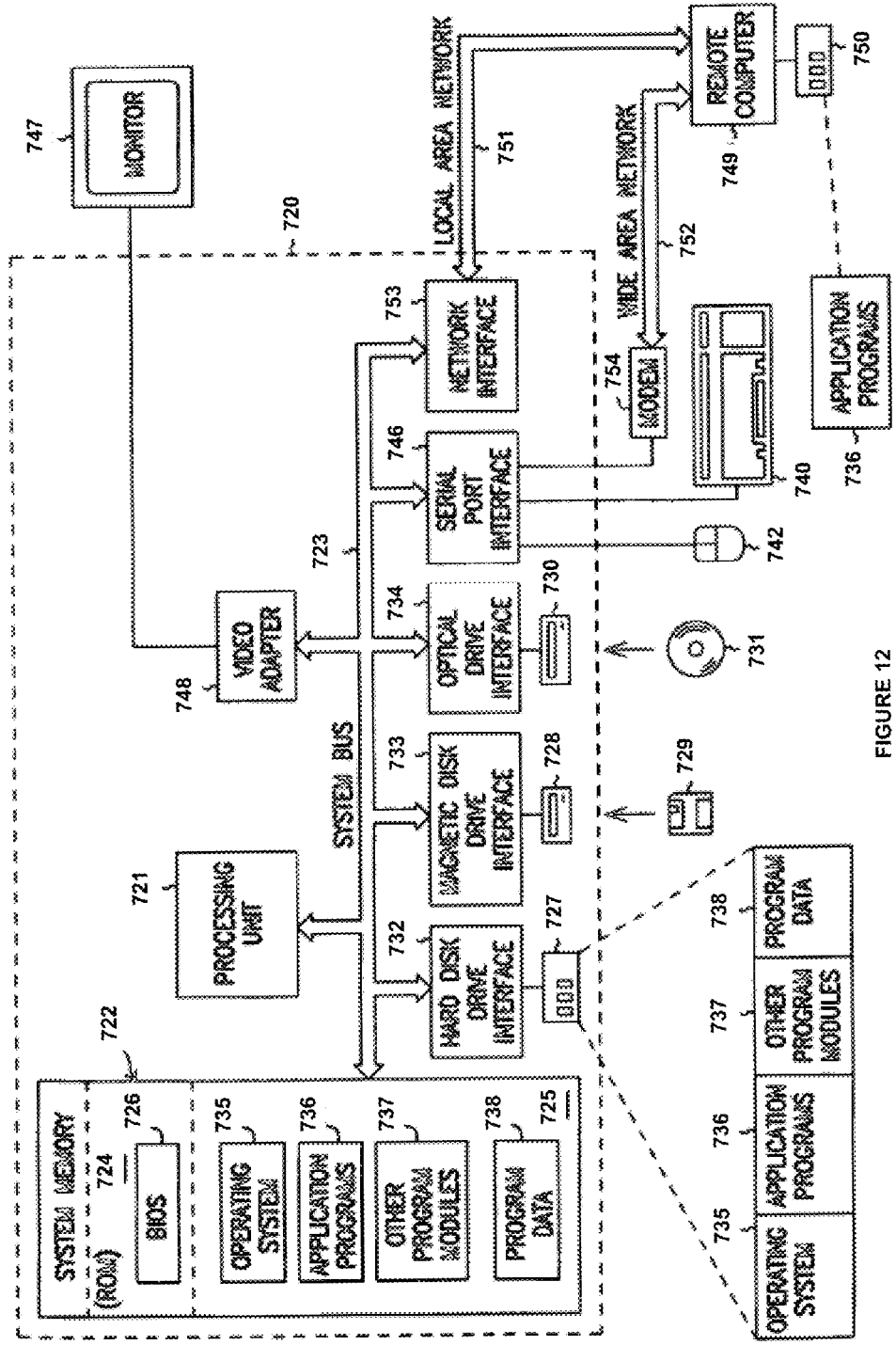
FIG. 12 illustrates an exemplary diagram of a suitable computing operating environment in which embodiments of the invention may be practiced.

FIG. 12 illustrates an exemplary diagram of a suitable computing operating environment in which embodiments of the invention may be practiced. The following description is associated with FIG. 12 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, Smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smart phones, display pagers, radio frequency (RF) devices, infrared (IR) devices, Personal Digital Assistants (PDAs), laptop computers, wearable computers, tablet computers, a device of the IPOD or IPAD family of devices manufactured by Apple Computer, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 12 includes a general purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. In one embodiment of the invention, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the invention, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the invention, the monitor comprises a Liquid Crystal Display (LCD). In addition to the monitor, computers typically include other peripheral output devices (not shown), such as speakers and printers. The monitor may include a touch sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiments is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. 7 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer a hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method implemented on portable device for determining a detectability at a target site of a noise level emitted by a fleet of vehicles including at least one vehicle at a given location, the method comprising:
   receiving a noise signature for each vehicle in the fleet;
   receiving a user input indicating an estimated distance to the target site;
   estimating noise pressure level for the fleet along the estimated distance from the given location to the target site based on the noise signature associated with each vehicle;
   calculating a background noise level at the target site;
   subtracting the background noise level at the target site from the noise pressure level of the fleet at the target site to determine an expected noise level above background noise at the target site thereby providing an estimate of the detectability of the fleet at the target site;
   displaying the expected noise level above background noise at the target site.

2. The method of claim 1, further comprising displaying a graph showing the noise pressure level of the fleet vs. distance from the given location to the target site.

3. The method of claim 1, further comprising:
   receiving a user input indicating a type of vegetation cover at the target site;
   receiving a user input indicating meteorological information comprising at least wind speed and direction; and
   calculating the background noise level at the target site based on the type of vegetation cover at the target site and the meteorological information.

4. The method of claim 3, further comprising:
   receiving an audio signal representing a background noise at the given location; and
   wherein calculating the background noise at the target site is based on the background noise at the given location, the type of vegetation cover at the target site and the meteorological information.

5. The method of claim 4, further comprising:
   receiving a user input indicating a type of vegetation cover at the given location;
   wherein calculating the background noise at the target site is based on the background noise at the given location, the type of vegetation cover at the given location, the type of vegetation cover at the target site, and the meteorological information.

6. The method of claim 1, further comprising:
   receiving a user input representing a planned route for the fleet on an electronic map;
   receiving a user input representing a type of vegetation cover along the planned route;
   receiving meteorological information comprising at least wind speed and direction;
   calculating estimated background noise level at the target site based on the type of vegetation cover and the meteorological information;
   calculating estimated noise pressure level of the fleet along the planned route using selected vegetation cover and meteorological information, and the noise signature associated with each vehicle in the fleet; and
   subtracting the estimated background noise level at the target site from the estimated noise pressure level of the fleet along the planned route to determine an expected noise level above background noise at the target site thereby providing an estimate of the detectability of the fleet along the planned route.

7. The method of claim 6, further comprising:
   categorizing the estimate of the detectability as a level of risk being at least one of high, medium or low and assigning a color to each level, thereby defining detectability level colors;
   overlaying the detectability level colors on the planned route thereby showing a map indicating by colors areas of detectability of the fleet along the planned route.

8. The method of claim 1, wherein receiving a noise signature for each vehicle in the fleet comprises:
   storing a plurality of different noise signatures in a library, each noise signature being associated with a different vehicle; and
   receiving a user selection of a noise signature for each vehicle in the fleet.

9. The method of claim 1, wherein receiving a noise signature for each vehicle in the fleet comprises:
   receiving, for each vehicle in the fleet, an audio signal representing the noise level generated by that vehicle;
   processing the audio signal to obtain the noise signature associated with each vehicle.

10. The method of claim 9, further comprising recording noise generated by the vehicle using a microphone operably connected to the portable device.

11. A method implemented on portable device for determining a detectability at a target site of a noise level emitted by a fleet of vehicles including at least one vehicle at a given location, the method comprising:
    receiving a noise signature for each vehicle in the fleet;
    receiving a first user input indicating an estimated distance to the target site;
    estimating noise pressure level for the fleet along the estimated distance from the given location to the target site based on the noise signature associated with each vehicle; and
    displaying a graph showing the noise pressure level vs. distance from the given location to the target site.

12. The method of claim 11, further comprising:
    receiving an audio file representing a background noise level at the given location;
    using the audio file estimating a background noise level at the target site;
    subtracting the estimated background noise level at the target site from the noise pressure level of the fleet at the target site to determine an expected noise level above background noise at the target site.

13. The method of claim 11, further comprising:
    receiving meteorological information from a remote server over a telecommunications network, the meteorological information comprising at least wind speed and direction;
    receiving a user input indicating a type of vegetation cover;
    calculating the estimated background noise level at the target site using the type of vegetation cover, the meteorological information, and the background noise at the given location.

14. A device comprising:
a hardware processor;
a non-transitory computer readable encoded storage medium;
said non-transitory computer readable storage media is further encoded with instructions, that when executed by the processor performs the steps of:
receiving a noise signature for each vehicle in the fleet;
receiving a user input indicating an estimated distance to the target site;
estimating noise pressure level for the fleet along the estimated distance from the given location to the target site based on the noise signature associated with each vehicle;
calculating a background noise level at the target site;
subtracting the background noise level at the target site from the noise pressure level of the fleet at the target site to determine an expected noise level above background noise at the target site thereby providing an estimate of the detectability of the fleet at the target site; and
displaying the expected noise level above background noise at the target site.

15. The device of claim 14, further comprising statements and instructions which cause the device to display a graph showing the noise pressure level of the fleet vs. distance from the given location to the target site.

16. The device of claim 14, further comprising statements and instructions which cause the device to perform the steps of:
receiving a user input indicating a type of vegetation cover at the target site;
receiving a user input indicating meteorological information comprising at least wind speed and direction; and
calculating the background noise level at the target site based on the type of vegetation cover at the target site and the meteorological information.

17. The device of claim 16, further comprising statements and instructions which cause the device to receiving an audio signal representing a background noise at the given location, wherein calculating the background noise at the target site is based on the background noise at the given location, the type of vegetation cover at the target site and the meteorological information.

18. The device of claim 17, further comprising statements and instructions which cause the device to receive a user input indicating a type of vegetation cover at the given location, wherein calculating the background noise at the target site is based on the background noise at the given location, the type of vegetation cover at the given location, the type of vegetation cover at the target site, and the meteorological information.

19. The device of claim 14, further comprising statements and instructions which cause the device to perform the steps of:
receiving a user input representing a planned route for the fleet on an electronic map;
receiving a user input representing a type of vegetation cover along the planned route;
receiving meteorological information comprising at least wind speed and direction;
calculating estimated background noise level at the target site based on the type of vegetation cover and the meteorological information;
calculating estimated noise pressure level of the fleet along the planned route using selected vegetation cover and meteorological information, and the noise signature associated with each vehicle in the fleet; and
subtracting the estimated background noise level at the target site from the estimated noise pressure level of the fleet along the planned route to determine an expected noise level above background noise at the target site thereby providing an estimate of the detectability of the fleet along the planned route.

20. The device of claim 19, further comprising statements and instructions which cause the device to perform the steps of:
categorizing the estimate of the detectability as a level of risk being at least one of high, medium or low and assigning a color to each level, thereby defining detectability level colors;
overlaying the detectability level colors on the planned route thereby showing a map indicating by colors areas of detectability of the fleet along the planned route.

* * * * *